(12) United States Patent
Fu et al.

(10) Patent No.: US 12,065,835 B2
(45) Date of Patent: Aug. 20, 2024

(54) ROOFING MATERIALS INCLUDING A LAYER OF A PARTING AGENT

(71) Applicant: Owens Corning Intellectual Capital, LLC, Toledo, OH (US)

(72) Inventors: Hai Fu, Pataskala, OH (US); Ozma Lane, Columbus, OH (US); William E. Smith, Pataskala, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 17/109,494

(22) Filed: Dec. 2, 2020

(65) Prior Publication Data

US 2021/0164228 A1 Jun. 3, 2021

Related U.S. Application Data

(60) Provisional application No. 62/942,966, filed on Dec. 3, 2019.

(51) Int. Cl.
*E04D 1/20* (2006.01)
*B32B 7/06* (2019.01)
(Continued)

(52) U.S. Cl.
CPC .......... *E04D 1/20* (2013.01); *B32B 7/06* (2013.01); *B32B 11/046* (2013.01); *B32B 11/12* (2013.01); *B32B 2419/06* (2013.01)

(58) Field of Classification Search
CPC .... E04D 1/20; E04D 1/22; E04D 1/26; B32B 7/06; B32B 11/046; B32B 11/12;
(Continued)

(56) References Cited

U.S. PATENT DOCUMENTS 1,494,380 A 5/1924 Schutte
2,263,200 A 11/1941 Wheeler et al.
(Continued)

FOREIGN PATENT DOCUMENTS

AU 2009245565 A1 11/2009
CA 2460741 A1 4/2003
(Continued)

OTHER PUBLICATIONS

Author Unknown, Pubchem Online, Calcium Stearate (Year: 2022).*
(Continued)

*Primary Examiner* — Nathan L Van Sell
(74) *Attorney, Agent, or Firm* — Calfee, Halter & Griswold LLP

(57) ABSTRACT

Asphalt-based roofing materials, such as shingles, are disclosed that include a band of a parting material. The asphalt-based roofing material includes at least one asphalt-coated substrate that defines a headlap portion and a tab portion each having opposed top and bottom surfaces; a layer of backdust applied to at least a portion of the bottom surface of the headlap portion and to at least a portion of the bottom surface of the tab portion; a release section of parting material applied to the layer of backdust, where the parting material is included in the in the range of 0.0005 kg/m² to 1 kg/m²; and an adhesive.

16 Claims, 9 Drawing Sheets

(51) Int. Cl.
*B32B 11/04* (2006.01)
*B32B 11/12* (2006.01)

(58) Field of Classification Search
CPC .......... B32B 2419/06; B32B 2262/101; B32B 5/022; B32B 5/028; B32B 11/02; B32B 19/04; B32B 27/32; B32B 27/36; B32B 2262/0276; B32B 19/02; B32B 2260/021; B32B 2260/042; B32B 2262/062; B32B 2264/10; B32B 2264/101; B32B 2264/102; B32B 2264/104; B32B 2307/542; B32B 5/024; B32B 7/12; B32B 11/06; B32B 11/10; B32B 2307/748
See application file for complete search history.

(56) References Cited

U.S. PATENT DOCUMENTS

| | | | |
|---|---|---|---|
| 2,332,221 A | 10/1943 | Harshberger | |
| 2,438,890 A | 4/1948 | Baskin | |
| 2,833,673 A | 5/1958 | Hart et al. | |
| 3,042,193 A * | 7/1962 | Wendt | E04D 5/12 206/324 |
| 3,045,395 A * | 7/1962 | Fasold | E04D 1/2918 52/527 |
| 3,138,897 A * | 6/1964 | McCorkle | E04D 1/26 52/420 |
| 3,239,992 A * | 3/1966 | Hodgson | E04D 1/29 53/397 |
| 3,247,631 A * | 4/1966 | Lovness | E04D 1/29 52/518 |
| 3,252,257 A * | 5/1966 | Price | E04D 1/26 52/518 |
| 3,813,280 A | 5/1974 | Olszyk et al. | |
| 3,903,340 A | 9/1975 | Shepherd | |
| 4,078,104 A | 3/1978 | Martin | |
| 4,173,489 A | 11/1979 | Crawford et al. | |
| 4,243,426 A | 1/1981 | Marzocchi et al. | |
| 4,447,500 A | 5/1984 | Ferris | |
| 4,992,315 A | 2/1991 | Zickell et al. | |
| 5,082,704 A * | 1/1992 | Higgins | D06N 5/00 428/41.4 |
| 5,240,760 A | 8/1993 | George et al. | |
| 5,382,449 A | 1/1995 | Hedges | |
| 5,756,214 A | 5/1998 | Waldron et al. | |
| 5,996,300 A | 12/1999 | Hamlin | |
| 6,426,309 B1 | 7/2002 | Miller et al. | |
| 6,506,444 B1 | 1/2003 | Mahr et al. | |
| 6,524,682 B1 | 2/2003 | Leavell | |
| 6,531,200 B2 | 3/2003 | Zickell et al. | |
| 6,610,147 B2 | 8/2003 | Aschenbeck | |
| 6,635,140 B2 | 10/2003 | Phillips et al. | |
| 6,701,685 B2 | 3/2004 | Rippey | |
| 6,709,994 B2 | 3/2004 | Miller et al. | |
| 6,887,515 B2 | 5/2005 | Zickell | |
| 6,919,398 B1 | 7/2005 | Born et al. | |
| 6,921,787 B2 | 7/2005 | Bate | |
| 7,183,358 B2 | 2/2007 | Bastelberger et al. | |
| 7,238,408 B2 | 7/2007 | Aschenbeck et al. | |
| 7,375,152 B2 | 5/2008 | Bate | |
| 7,442,270 B2 | 10/2008 | Bartek | |
| 7,449,233 B2 | 11/2008 | Arora | |
| 7,452,598 B2 | 11/2008 | Shiao et al. | |
| 7,514,017 B2 | 4/2009 | Bhamidipati | |
| 7,524,545 B2 | 4/2009 | Bany et al. | |
| 7,541,059 B2 | 6/2009 | Aschenbeck et al. | |
| 7,651,559 B2 | 1/2010 | Whitaker et al. | |
| 7,737,057 B2 | 6/2010 | Bany et al. | |
| 7,803,725 B2 | 9/2010 | Payne et al. | |
| 7,805,909 B2 | 10/2010 | Teng et al. | |
| 7,833,339 B2 | 11/2010 | Whitaker et al. | |
| 7,977,259 B2 | 7/2011 | Ratcliff et al. | |
| 8,058,342 B1 | 11/2011 | Stevens et al. | |
| 8,530,034 B2 | 9/2013 | Khan et al. | |
| 8,568,524 B2 | 10/2013 | Li et al. | |
| 8,771,826 B2 | 7/2014 | Whitaker et al. | |
| 9,259,860 B2 | 2/2016 | Kalkanoglu et al. | |
| 9,446,568 B2 | 9/2016 | Larson et al. | |
| 9,511,566 B2 | 12/2016 | Grube et al. | |
| 9,574,350 B2 | 2/2017 | Loftus et al. | |
| 9,670,677 B2 | 6/2017 | Shiao et al. | |
| 9,700,915 B2 | 7/2017 | Ruda | |
| 9,834,626 B2 | 12/2017 | Chisholm et al. | |
| 9,850,623 B2 | 12/2017 | Krigstin et al. | |
| 9,970,153 B2 | 5/2018 | Deng et al. | |
| 10,060,132 B2 | 8/2018 | Beerer et al. | |
| 10,113,314 B2 | 10/2018 | Humphreys | |
| 10,458,119 B2 | 10/2019 | Grubka et al. | |
| 10,584,494 B2 | 3/2020 | Wise et al. | |
| 10,697,179 B2 | 6/2020 | Humphreys | |
| 10,865,565 B2 | 12/2020 | Smith et al. | |
| 10,865,566 B2 | 12/2020 | Smith et al. | |
| 10,865,567 B2 | 12/2020 | Smith et al. | |
| 11,124,968 B2 | 9/2021 | Vermilion et al. | |
| 11,136,761 B2 | 10/2021 | Vermilion et al. | |
| 11,359,377 B2 | 6/2022 | Smith et al. | |
| 2003/0068469 A1 | 4/2003 | Aschenbeck et al. | |
| 2004/0014385 A1 | 1/2004 | Greaves, Jr. et al. | |
| 2004/0206035 A1* | 10/2004 | Kandalgaonkar | E04D 1/26 52/551 |
| 2004/0258883 A1* | 12/2004 | Weaver | B32B 11/04 428/143 |
| 2005/0072110 A1 | 4/2005 | Shiao et al. | |
| 2005/0252141 A1 | 11/2005 | Kerkar et al. | |
| 2005/0260910 A1 | 11/2005 | Brzozowski et al. | |
| 2006/0179767 A1* | 8/2006 | Miller | E04D 1/26 52/555 |
| 2006/0235143 A1 | 10/2006 | Muller et al. | |
| 2006/0240224 A1 | 10/2006 | Khan et al. | |
| 2006/0243388 A1 | 11/2006 | Kubiak et al. | |
| 2007/0049144 A1 | 3/2007 | Brzozowski et al. | |
| 2007/0224135 A1 | 9/2007 | Liu et al. | |
| 2007/0261337 A1 | 11/2007 | Whitaker et al. | |
| 2008/0011194 A1 | 1/2008 | Mecca et al. | |
| 2008/0044626 A1* | 2/2008 | Aschenbeck | E04D 5/12 428/144 |
| 2008/0060301 A1* | 3/2008 | Wang | C08L 53/00 52/408 |
| 2008/0086970 A1 | 4/2008 | Teng et al. | |
| 2008/0115444 A1 | 5/2008 | Kalkanoglu et al. | |
| 2008/0193778 A1 | 8/2008 | Bakir et al. | |
| 2009/0220743 A1 | 9/2009 | Aschenbeck et al. | |
| 2009/0249728 A1 | 10/2009 | Teng et al. | |
| 2010/0005745 A1 | 1/2010 | Harrington, Jr. | |
| 2010/0098912 A1 | 4/2010 | Snyder et al. | |
| 2010/0151198 A1 | 6/2010 | Khan | |
| 2010/0203290 A1 | 8/2010 | Whitaker et al. | |
| 2010/0236178 A1* | 9/2010 | Loftus | C08L 95/00 52/518 |
| 2010/0291818 A1 | 11/2010 | Youn | |
| 2010/0307087 A1 | 12/2010 | Zoellner | |
| 2011/0072752 A1 | 3/2011 | Aschenbeck et al. | |
| 2011/0139366 A1* | 6/2011 | Belt | B32B 11/02 156/279 |
| 2011/0257295 A1 | 10/2011 | Li et al. | |
| 2011/0265407 A1 | 11/2011 | Bryson | |
| 2011/0283646 A1* | 11/2011 | Vermilion | E04D 1/26 52/539 |
| 2012/0258282 A1 | 10/2012 | Hammond | |
| 2012/0260597 A1 | 10/2012 | Jenkins et al. | |
| 2012/0288678 A1 | 11/2012 | Grube et al. | |
| 2012/0305171 A1 | 12/2012 | Hammond | |
| 2013/0089707 A1 | 4/2013 | Faure | |
| 2013/0122232 A1 | 5/2013 | Hopkins, II | |
| 2013/0122769 A1 | 5/2013 | Brabbs et al. | |
| 2013/0160674 A1 | 6/2013 | Hong et al. | |
| 2013/0167965 A1 | 7/2013 | Cheney et al. | |
| 2013/0171414 A1 | 7/2013 | Shiao et al. | |
| 2014/0272402 A1 | 9/2014 | Dubey et al. | |
| 2015/0175317 A1 | 6/2015 | Imai et al. | |
| 2015/0239005 A1* | 8/2015 | Humphreys | E04D 1/20 428/489 |

(56) References Cited

U.S. PATENT DOCUMENTS

| | | | |
|---|---|---|---|
| 2015/0240495 A1 | 8/2015 | Vermilion et al. | |
| 2015/0275521 A1 | 10/2015 | Bader et al. | |
| 2016/0186437 A1* | 6/2016 | Harrington | B32B 5/147 52/232 |
| 2016/0244969 A1 | 8/2016 | Beerer et al. | |
| 2016/0369509 A1 | 12/2016 | Leitch et al. | |
| 2017/0029649 A1 | 2/2017 | Ali et al. | |
| 2017/0321423 A1* | 11/2017 | Aschenbeck | E04D 1/29 |
| 2017/0362830 A1 | 12/2017 | Buckingham et al. | |
| 2018/0051465 A1 | 2/2018 | Grubka et al. | |
| 2018/0087275 A1 | 3/2018 | Canova et al. | |
| 2018/0281017 A1 | 10/2018 | Humphreys et al. | |
| 2018/0291629 A1 | 10/2018 | Humphreys | |
| 2018/0363302 A1 | 12/2018 | Beerer et al. | |
| 2019/0017273 A1 | 1/2019 | Vermilion et al. | |
| 2019/0032337 A1 | 1/2019 | Sipag et al. | |
| 2019/0077700 A1 | 3/2019 | Xu et al. | |
| 2019/0271160 A1 | 9/2019 | Freeborg et al. | |
| 2019/0277028 A1 | 9/2019 | Chevillard et al. | |
| 2021/0214944 A1 | 7/2021 | Verhoff et al. | |
| 2021/0381240 A1 | 12/2021 | Vermilion et al. | |
| 2021/0381241 A1 | 12/2021 | Vermilion et al. | |
| 2022/0268025 A1 | 8/2022 | Smith et al. | |
| 2022/0389715 A1 | 12/2022 | Lane et al. | |

FOREIGN PATENT DOCUMENTS

| | | |
|---|---|---|
| CA | 2508484 C | 7/2010 |
| CA | 2759718 A1 | 5/2013 |
| CA | 2559855 C | 5/2015 |
| CA | 2882641 A1 | 8/2015 |
| CA | 2921279 A1 | 8/2016 |
| CA | 2933050 A1 | 12/2016 |
| CA | 2923675 C | 8/2017 |
| CA | 3035791 A1 | 9/2019 |
| CA | 3044450 A1 | 1/2020 |
| CA | 3100855 A1 | 1/2020 |
| CN | 1439683 A | 9/2003 |
| CN | 200958267 Y | 10/2007 |
| CN | 203499128 U | 3/2014 |
| CN | 203654622 U | 6/2014 |
| CN | 105131765 A | 12/2015 |
| CN | 105802410 A | 7/2016 |
| CN | 107177246 A | 9/2017 |
| DE | 102007050727 A1 | 4/2008 |
| EP | 2455560 A2 | 5/2012 |
| GB | 813520 A | 5/1959 |
| GB | 1398895 A | 6/1975 |
| WO | 03031748 A2 | 4/2003 |
| WO | 03044124 A1 | 5/2003 |
| WO | 03097757 A1 | 11/2003 |
| WO | 2004050774 A2 | 6/2004 |
| WO | 2006060714 A1 | 6/2006 |
| WO | 2007078903 A1 | 7/2007 |
| WO | 2007133393 A1 | 11/2007 |
| WO | 2014038701 A1 | 3/2014 |
| WO | 2016082025 A1 | 6/2016 |
| WO | 2016210379 A1 | 12/2016 |
| WO | 2019077604 A1 | 4/2019 |
| WO | 2020006430 A1 | 1/2020 |
| WO | 2020168019 A1 | 8/2020 |

OTHER PUBLICATIONS

Splash Proof, LLC, "What is Splash Proof Nanotechnology Coating?" (2018), 2 pages, retrieved from the internet at: https://splashproofamerica.com/our-product/.

NanoSeal Tile Roof Sealant (2017-2018), 7 pages, retrieved from the internet at: http://nanoseal.com/tile-roof-coating/.

T.T Chau et al., "A review of factors that affect contact angle and implications for flotation practice," Advances in Colloid and Interface Science 150, pp. 106-115 (2009).

\* cited by examiner

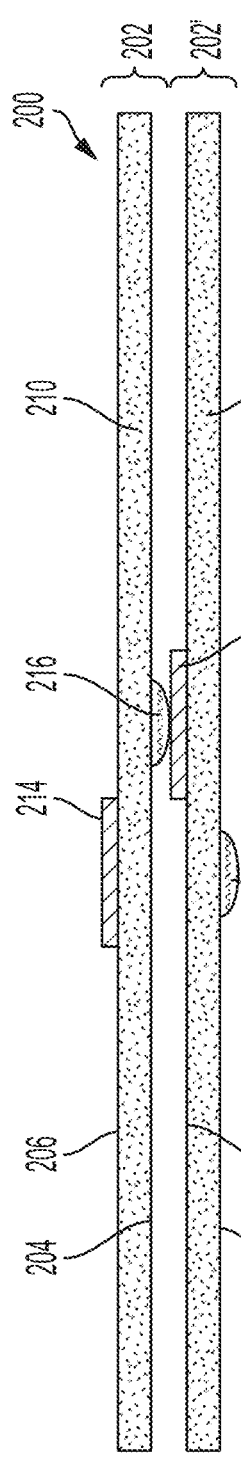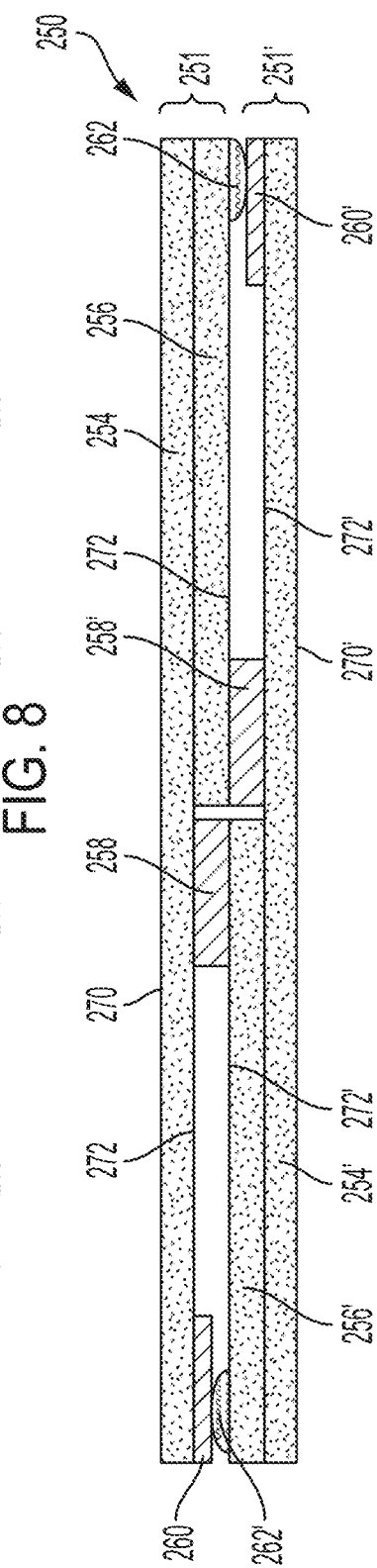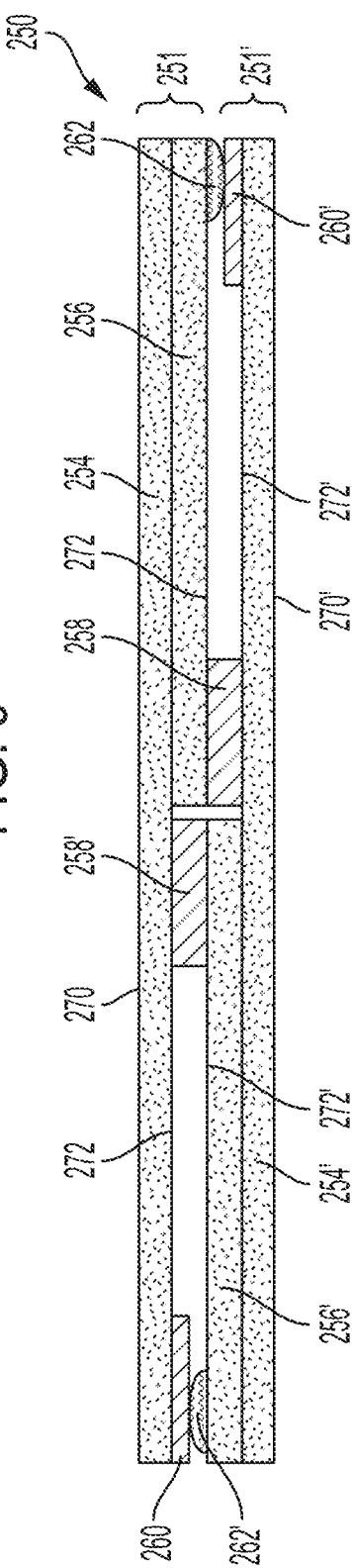

ROOFING MATERIALS INCLUDING A LAYER OF A PARTING AGENT

CROSS-REFERENCE TO RELATED APPLICATIONS

The present application claims benefits and priority to U.S. Provisional Patent Application No. 62/942,966 filed on Dec. 3, 2019, the entire disclosure of which is incorporated herein by reference.

FIELD

The present disclosure relates to roofing materials. In particular, the present disclosure relates to roofing materials, such as shingles, that include a layer of a parting agent material.

BACKGROUND

Asphalt-based roofing materials, such as roofing shingles and roll roofing, are installed on the roofs of buildings to provide protection from the elements, and in some instances, to give the roof an aesthetically pleasing look. Typically, the roofing material is constructed of a substrate, such as a glass fiber mat or an organic felt, an asphalt coating on the substrate, a decorative/protective layer of granules applied to the asphalt coating on a top face of the substrate, and a layer of sand or other particulate matter (often referred to as "backdust") applied to the asphalt coating on a bottom face of the substrate.

While the asphalt coating on the roofing material typically includes a layer of granules applied to the top face and a layer of backdust applied to the bottom face, roofing materials are still often prone to sticking due to the asphalt coatings. The issue of sticking is particularly prevalent in roofing materials, such as certain shingles for example, in the "common bond area" when they are stacked back to back. Further, shingles often include an adhesive on the bottom surface to bond successive layers of shingles during installation. Accordingly, controlling and preventing the sticking of successive layers roofing materials when they are stacked, packaged, and/or stored for a prolonged period of time is a concern in the industry. Typical methods of preventing roofing materials from sticking include the use of release tapes. Release tapes are polymeric tapes applied to a surface of the roofing materials during manufacturing. However, the use of release tapes adds cost, complexity, and manufacturing delays.

Accordingly, there is an unmet need in the art for roofing materials that overcome one or more of the aforementioned deficiencies.

SUMMARY

Disclosed herein are asphalt-based roofing materials that include a band of a parting agent material on at least one surface of the roofing material. To illustrate various aspects of the present disclosure, several exemplary embodiments of asphalt-based roofing materials are provided.

In one embodiment, a laminated shingle is provided that includes a first substrate comprising a headlap portion and a tab portion each having opposed top and bottom surfaces, said first substrate being coated with a first asphalt coating composition; a second substrate having opposed top and bottom surfaces, said second substrate being coated with a second asphalt coating composition; and an adhesive adhering a portion of the bottom surface of the tab portion of the first substrate to a portion of the top surface of the second substrate, forming a common bond area; a primary release section located along a portion of the bottom surface of the headlap portion; and a secondary release section located on a portion of the bottom surface of the second substrate and/or a portion of the bottom surface of the first substrate, wherein secondary release section comprises a parting agent material, said parting agent material being included on the shingle in an amount from 0.0005 kg/m² to 1 kg/m².

In any of the exemplary embodiments, the parting agent material comprises at least one parting agent material selected from metal salts of fatty acids, silanes, siloxanes, silicones, silicone rubbers, waxes, styrene-butadiene rubbers (SBR), esters of acrylic resins, polyolefins, and combinations thereof.

In any of the exemplary embodiments, the parting agent material comprises a metal salt of a fatty acid.

In any of the exemplary embodiments, the fatty acid has a solubility of less than 0.010 g/100 mL at 15° C.

In any of the exemplary embodiments, the metal salt of a fatty acid is selected from group consisting of metal laurates, metal myristates, metal palmitates, metal stearates, and combinations thereof.

In any of the exemplary embodiments, the metal salt of a fatty acid includes a metal stearate.

In any of the exemplary embodiments, the metal stearate is selected from the group consisting of zinc stearate, calcium stearate, aluminum stearate, magnesium stearate, and combinations thereof.

In any of the exemplary embodiments, the primary release section comprises a primary release tape.

In any of the exemplary embodiments, the primary release section comprises the parting agent material.

In any of the exemplary embodiments, the secondary release section is located along the common bond area on the second substrate and/or adjacent to the common bond area on the first substrate.

In any of the exemplary embodiments, the secondary release section has a width in the range of 1 cm to 16 cm.

In any of the exemplary embodiments, the shingle has a lap shear of less than 110 lbs. of force.

In any of the exemplary embodiments, the first asphalt coating composition and the second asphalt coating composition are different.

In one embodiment, a shingle is provided that includes a substrate having opposed top and bottom surfaces, wherein the substrate is coated with an asphalt coating composition; a layer of backdust applied to at least a portion of the bottom surface of the substrate; a layer of granules embedded in the asphalt coating composition on the top surface of the substrate; and a release section located along at least a portion of the layer of backdust, said release section comprising a parting agent material, said parting agent material being included in an amount from 0.0005 kg/m² to 1 kg/m².

In any of the exemplary embodiments, the shingle is single layer tabbed shingle.

In any of the exemplary embodiments, the parting agent material is disposed on a layer of a support polymer.

In one embodiment, a method of preparing a shingle is provided that includes coating a reinforcement material with an asphalt coating composition to form an asphalt-coated sheet having a front side and an opposing back side; applying granules to the front side of the asphalt-coated sheet to form a granule-covered sheet; applying backdust to form a layer of backdust on the back side of the granule-covered sheet; applying a parting agent composition on a portion of the layer of backdust, wherein the parting agent composition is applied to form a layer of parting agent material in an amount from 0.0005 kg/m² to 1 kg/m²; and cutting the granule-covered sheet to from a tab portion.

In any of the exemplary embodiments, the parting agent composition further comprises an emulsifier, and a wetting agent.

In any of the exemplary embodiments, the parting agent material comprises at least one parting agent selected from metal salts of fatty acids, silanes, siloxanes, silicones, silicone rubbers, waxes, styrene-butadiene rubbers (SBR), esters of acrylic resins, polyolefins, and combinations thereof.

In any of the exemplary embodiments, the parting agent material a metal salt of a fatty acid.

In any of the exemplary embodiments, the step of cutting the granule covered sheet to from a tab portion forms an overlay sheet; and the method further comprises cutting the granule covered sheet to from an underlay sheet; and laminating the underlay sheet to the tab portion of the overlay sheet.

In one embodiment, a bundle of shingles is provided comprising a first shingle disposed on a second shingle, where the first shingle and the second shingle each comprise an asphalt coated substrate having a first surface at least partially covered in granules on a front side of the shingle and an opposing second surface at least partially covered in backdust on a back side of the shingle; an adhesive; a primary release section; and a secondary release section that comprises a parting agent material. The parting agent material is included on the shingle in an amount from 0.0005 kg/m² to 1 kg/m². The adhesive of the first shingle is in contact with the primary release section of the second shingle and the adhesive of the second shingle is in contact with the primary release section of the first shingle.

In any of the exemplary embodiments, the first shingle and the second shingle are oriented such that the front surface of the first shingle faces the back surface of the second shingle.

In any of the exemplary embodiments, the first shingle and the second shingle are oriented such that the back surface of the first shingle faces the back surface of the second shingle.

In any of the exemplary embodiments, the secondary release section of the first shingle is in contact with the backdust of the second shingle and secondary release section of the second shingle is in contact with the backdust of the first shingle.

In any of the exemplary embodiments, the secondary release section is located on the back side of each of the first shingle and the second shingle.

In any of the exemplary embodiments, the primary release section is located on the back side of each of the first shingle and the second shingle.

In any of the exemplary embodiments, the primary release section is located on the front side of each of the first shingle and the second shingle.

In any of the exemplary embodiments, the primary release section comprises a primary release tape.

In any of the exemplary embodiments, the primary release section comprises the parting agent material.

In any of the exemplary embodiments, the first shingle and the second shingle are each single layer tabbed shingles.

In any of the exemplary embodiments, the first shingle and the second shingle are each laminated shingles.

BRIEF DESCRIPTION OF THE DRAWINGS

FIG. 8 is a side elevational view of stack of a single layer tabbed shingles;

FIG. 9 is a side elevational view of stack of a single layer tabbed shingles;

FIG. 10 is a side elevational view of stack of laminated shingles;

DETAILED DESCRIPTION

Figure 1:
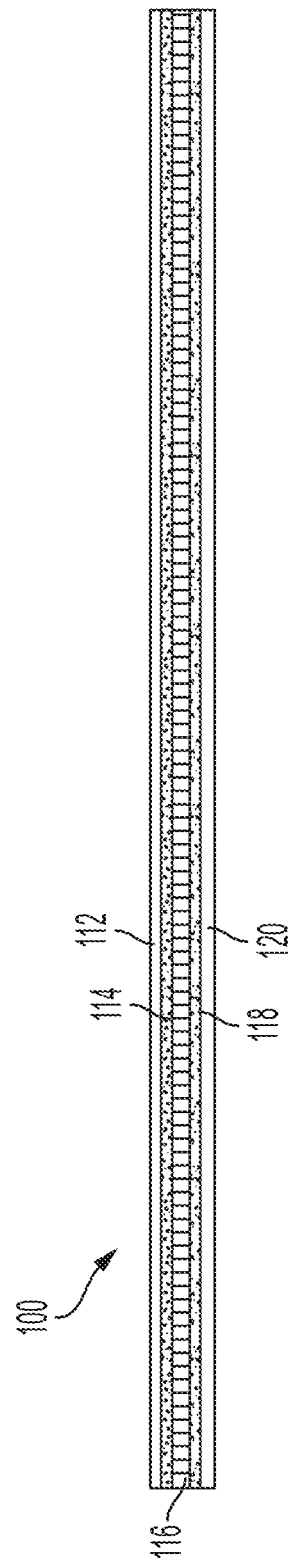
FIG. 1 is a side elevational view of a single layer tabbed shingle.

The general inventive concepts will now be described with occasional reference to the illustrated embodiments thereof. The general inventive concepts may, however, be embodied in different forms and should not be construed as limited to the embodiments set forth herein, nor in any order of preference. Rather, the embodiments are provided so that this disclosure will be more thorough, and will convey the scope of the general inventive concepts to those skilled in the art.

Unless otherwise defined, all technical and scientific terms used herein have the same meaning as commonly understood by one of ordinary skill in the art to which this invention belongs. The terminology used in the description is for describing particular embodiments only and is not intended to be limiting of the general inventive concepts. As used in the description and the appended claims, the singular forms "a," "an," and "the" are intended to include the plural forms as well, unless the context clearly indicates otherwise.

Unless otherwise indicated, all numerical values as used in the description and claims are to be understood as being modified in all instances by the term "about." Accordingly, unless otherwise indicated, the numerical values set forth in the description and claims are approximations that may vary depending on the desired properties sought to be obtained in embodiments of the present disclosure. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Embodiments are based, at least in part, on a shingle that replaces at least one release tape with a parting agent material. In any of the exemplary embodiments, the shingle includes at least one asphalt-coated substrate comprising a top surface and an opposing bottom surface and a layer of parting agent material applied to at least a portion of on the bottom surface. Advantageously, the inclusion of the parting agent material helps to reduce shingle-to-shingle sticking while shingles are stacked, for example, during shipping or storage.

A portion of the shingle that has been configured to reduce shingle-to-shingle sticking may be referred to herein as a "release section." The release section may be configured as a strip or band that runs longitudinally along the shingle. In addition to the parting agent material, the shingle may include one or more additional release sections. The additional release sections may include a parting agent material or a release tape. Accordingly, the shingle may include one or more release sections selected from parting agent material or release tapes, with the proviso that at least one release section is a parting agent material. In any of the exemplary embodiments, the shingle comprises at least one asphalt-coated substrate having opposed top and bottom sides, an adhesive, a layer of backdust applied to a surface on the bottom side, a release section that includes a parting agent material applied to the bottom surface of the asphalt-coated substrate. In any of the exemplary embodiments, the shingle may comprise at least two release sections. One or both of the primary and secondary release sections may be a layer of parting agent material.

The shingle may comprise any shingle structure known or commonly used in the art. Based on one or more variables such as the type of shingle, location of an adhesive or sealant, and the desired stacking orientation, the shingle may have one or more release sections in various locations on the shingle. Exemplary ways to orient two or more stacked shingles includes orienting adjacently stacked shingles in a front-to-back (i.e., granule side to bottom side) or an alternating front-to-front (i.e., granule side to granule side)/back-to-back (i.e., bottom side to bottom side) configuration. An adhesive or sealant may be placed on the shingles to bond together successive layers of shingles during installation. To prevent the shingle from prematurely adhering to the adhesive or sealant of an adjacent shingle during while stacked, the shingle may include a release section. As used herein, a release section located on a shingle to prevent the shingle from sticking to the adhesive or sealant of an adjacent shingle may be referred to herein as a "primary" release section.

In any of the exemplary embodiments, the shingle may include a secondary release section. Secondary release sections prevent the sticking of adjacent shingles in a stack at locations other than adhesive. Conventionally, shingles often include a layer of backdust on the back surface of the shingle to reduce the sticking of adjacent shingles in a stack caused by the asphalt coating on the substrate. However, it has been surprisingly discovered that a secondary release section may be added to the bottom surface of a shingle to further inhibit adjacent shingles from sticking while in a stacked orientation. Particularly, the presence of the secondary release section reduces or inhibits sticking between adjacent shingles stacked in a back-to-back or front-to-back orientation.

A stack of shingles may include a first shingle disposed on a second shingle, where the first and second shingle each comprise an asphalt coated substrate with a first surface at least partially covered in granules on a front side of the shingle and an opposing second surface at least partially covered in backdust on a back side of the shingle. The shingles further include an adhesive and a primary release section. At least one of the adjacently stacked shingles further includes a secondary release section. In some exemplary embodiments, the adhesive of the first shingle is in contact with the primary release section of the second shingle and the adhesive of the second shingle is in contact with the primary release section of the first shingle. A stack of shingles may comprise any type of shingle, such as, for example, single layer tabbed shingles, laminated shingles, or combinations thereof. In any of the exemplary embodiments, first shingle and the second shingle may be stacked in a face-to-back configuration, such that adjacent shingles are stacked with the front surface of the first shingle facing the back surface of the second shingle. In any of the exemplary embodiments, the first shingle and the second shingle may be stacked in a back-to-back configuration, such that adjacent shingles are stacked with the back surface of the first shingle facing the back surface of the second shingle. In certain embodiments, where the first shingle and the second shingle are stacked in a back-to-back configuration, the secondary release section of the first shingle is in contact with the backdust of the second shingle and secondary release section of the second shingle is in contact with the backdust of the first shingle.

In any of the exemplary embodiments, where the shingles are stacked front-to-back, the adhesive may be on the back of the shingle, and the primary release section may be located on the front of the shingle, for example, along or parallel to the edge of the face of headlap portion. In other embodiments, where the shingles are stacked in a front-to-front/back-to-back orientation, the adhesive may be located on the front of the shingle and the primary release section may be located on the back of the shingle. In other embodiments, where the shingles are stacked front-to-front/back-to-back, the adhesive may be on the back of the shingle and the primary release section may be located on the back of the shingle.

Figure 2:
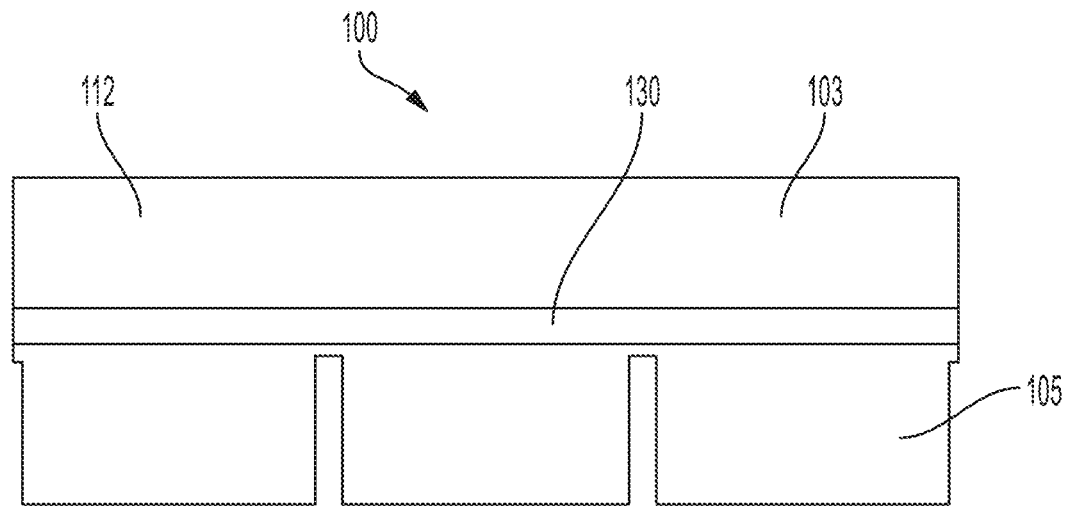
FIG. 2 is a top plan view of the single layer tabbed shingle of FIG. 1.
Figure 3:
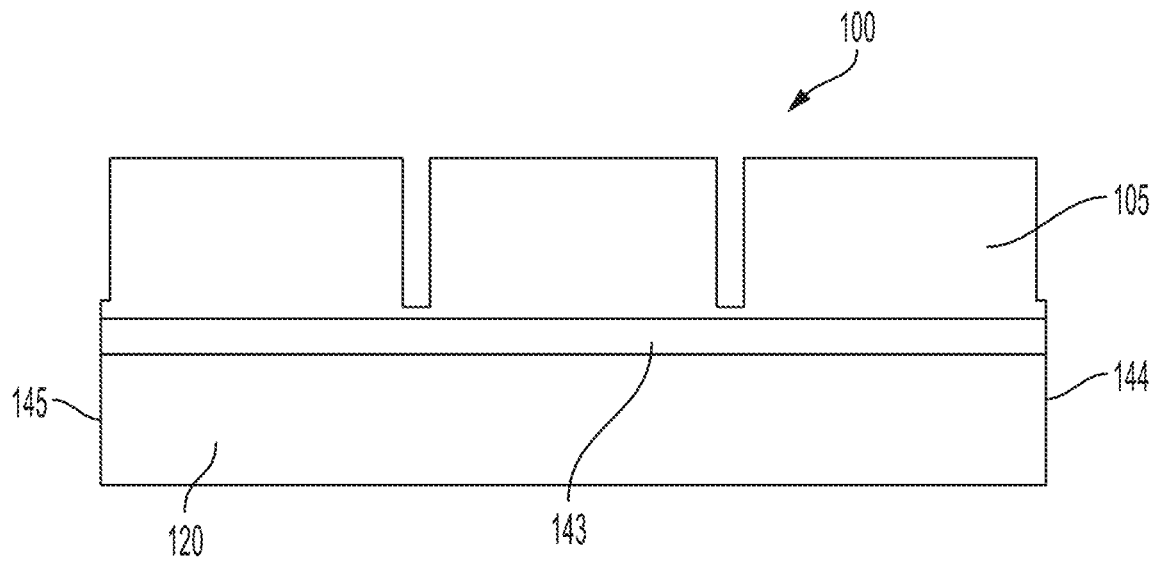
FIG. 3 is a bottom plan view of the single layer tabbed shingle of FIG. 1.
Figure 4:
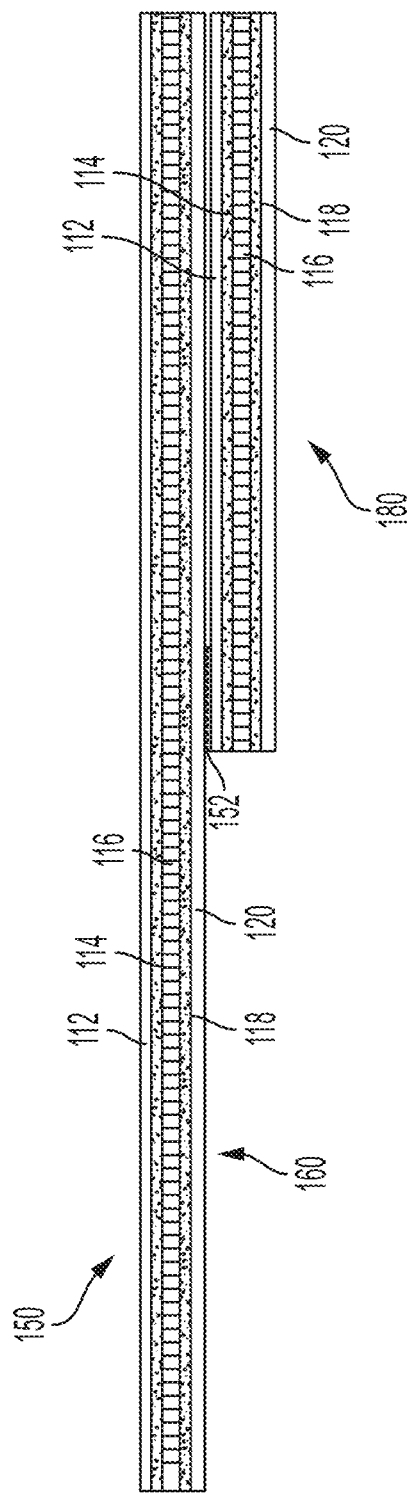
FIG. 4 is a side elevational view of a laminated shingle.

In one or more exemplary embodiments, the shingle is a single layer tabbed shingle. As illustrated in FIGS. 1, 2, and 3, a single layer tabbed shingle 100 comprises a substrate 116 that is impregnated, such that the coating extends the entire thickness of the substrate from the top surface to the bottom surface. Thus, the asphalt forms a first asphalt coating 114 on the top surface of the substrate and a second asphalt coating 118 on the bottom surface of the substrate 116. The single layer tabbed shingle 100 also comprises a surface layer of granules 112 embedded in the first asphalt coating 114. A backdust layer of particles 120 may optionally be embedded in the second asphalt coating 118. The first asphalt coating 114 is positioned above the substrate 116 when the shingles are installed on a roof and the second asphalt coating 118 is positioned below the substrate when the shingles are installed on the roof.

Referring now to FIG. 2, a top view of the single layer tabbed shingle 100 is shown. The single layer tabbed shingle 100 includes a tab portion 105, which is defined by tabs and cutout sections, and a headlap portion 103. The upper surface of the single layer tabbed shingle 100 includes a surface layer of granules 112 on the headlap portion 103 and the tab portion 105. The shingle 100 includes an adhesive 130 applied to a top surface of the headlap portion 103. Adhesive 130 may be an adhesive, sealant, or the like (hereinafter the "adhesive"). In the single layer tabbed shingle 100, the adhesive 130 may be applied to the surface layer of granules 112 on the headlap portion 103.

Referring now to FIG. 3, a bottom view of the single layer tabbed shingle 100 is shown. The bottom surface of the single layer tabbed shingle 100 includes a backdust layer of particles 120 on the headlap portion 103 and the tab portion 105. The single layer tabbed shingle 100 also includes a release section 143 applied to a bottom surface of the headlap portion 103 of the single layer tabbed shingle 100. The release section 143 is a band that includes a length that spans from a first edge 144 of the shingle 100 to a second edge 145 of the single layer tabbed shingle 100. The release section 143, may include a width of about of 1 cm to 16 cm, 1.5 cm to 12 cm, or 2 cm to 8 cm. The release section 143 may run along or parallel to the edge of the headlap portion 103 that is adjacent the tab portion 105. The release section 143 may be applied directly to the second asphalt coating 118 or the backdust layer of particles 120. The release section 143 comprises a parting agent material and is free of a release tape. While shown as a continuous strip, the release section 143 may also be applied to form a design or a pattern.

Alternatively, the shingle may comprise a laminated shingle. As illustrated in FIGS. 4, 5, 6 and 7, a laminated shingle 150 comprises an upper or overlay sheet 160 attached to a lower or underlay sheet 180 with an adhesive 152 to form the laminated shingle 150. Similar to the single layer tabbed shingle 100, each sheet generally comprises a substrate 116, a first asphalt coating 114 on the top surface of the substrate 116, a surface layer of granules 112 embedded in the first asphalt coating 114, a second asphalt coating 118 on the bottom surface of the substrate 116, and a backdust layer of particles 120 embedded in the second asphalt coating 118.

Figure 5:
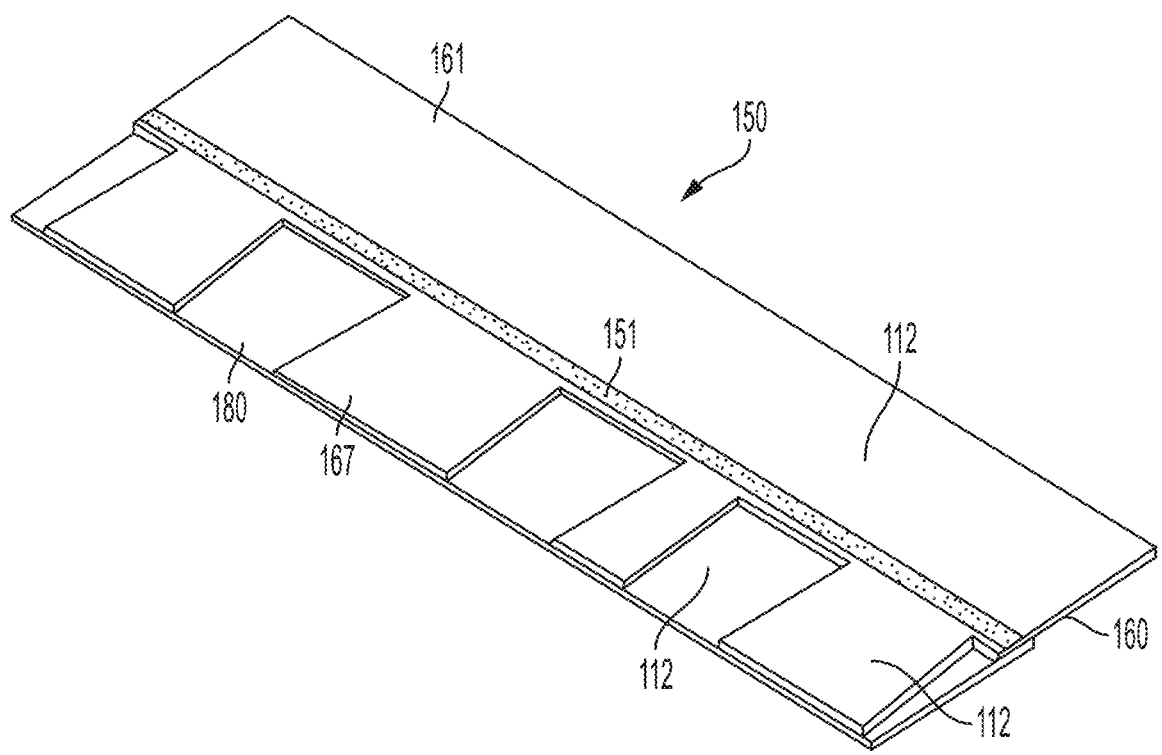
FIG. 5 is a top perspective view of the laminated shingle of FIG. 4.

Referring now to FIG. 5, a top view of the laminated shingle 150 is shown. The overlay sheet 160 includes a tab portion 167, which is defined by tabs and cutout sections, and a headlap portion 161. The tab portion 167 may also be referred to in the art as a dragon tooth portion. Through the cutout sections of tab portion 167 the underlay sheet 180 is visible. The upper surface of the headlap portion 161 includes a surface layer of granules 112 and, optionally, reinforcement layer 151. Additionally, upper surfaces of the tab portion 167 (including the underlay sheet 180) have a surface layer of granules 112.

Figure 6:
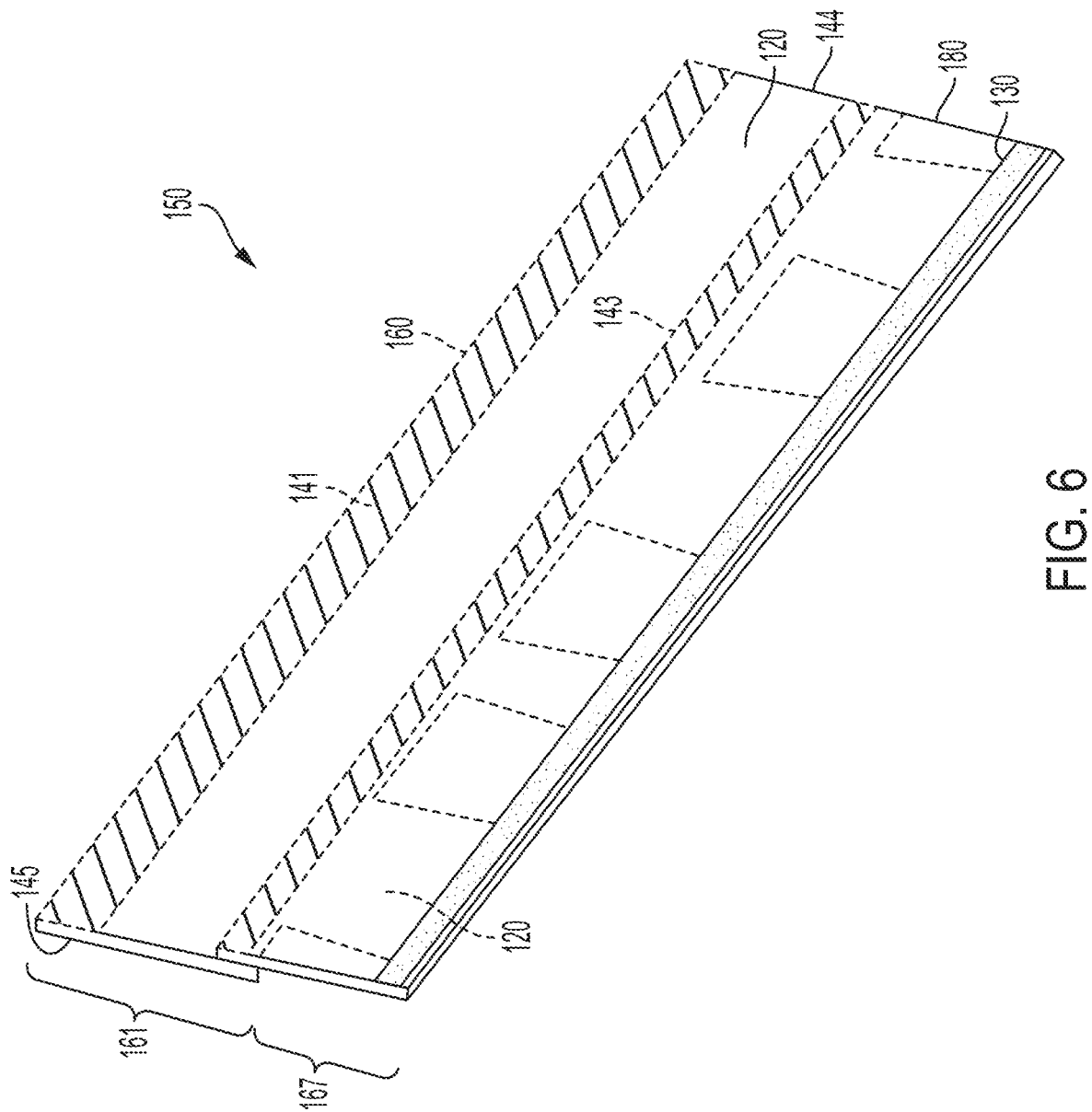
FIG. 6 is a bottom perspective view of the laminated shingle of FIG. 4.
Figure 7:
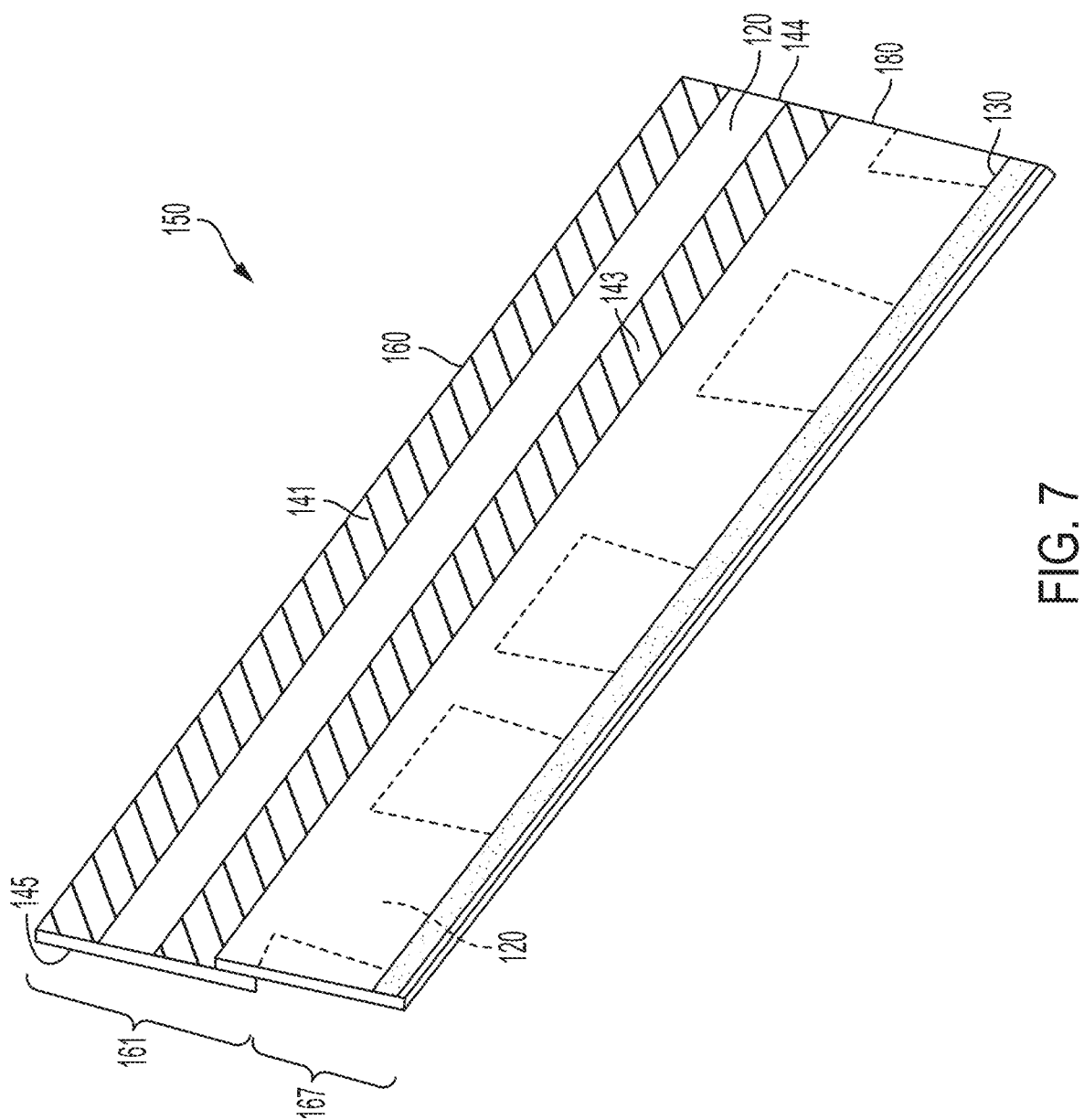
FIG. 7 is a bottom perspective view of the laminated shingle of FIG. 4.

Referring now to FIGS. 6 and 7, a bottom view of the laminated shingle 150 is shown. The laminated shingle 150 includes an adhesive 130 applied to a bottom surface of the tab portion 167 of the laminated shingle 150. Similar to the single layer tabbed shingle 100, the adhesive 130 may be an adhesive, sealant, or the like. Laminated shingle 150 also includes a primary release section 141 applied to a bottom surface of the headlap portion 161 of the laminated shingle 150. The primary release section 141 is a band that includes a length that spans from a first edge 144 of the laminated shingle 145 to a second edge of the laminated shingle 150. The primary release section 141, may include a width of 0.5 cm to 6 cm, 0.75 cm to 3.5 cm, or 1 cm to 2.6 cm. The primary release section 141 may run along or parallel to the edge of the headlap portion 161 that is opposite the tab portion 167. The primary release section 141 may be applied to the second asphalt coating 118 or the backdust layer of particles 120. The primary release section 141 may be a release tape or a layer of parting agent material. The laminated shingle 150 also includes a secondary release section 143 on the bottom surface of the underlay sheet 180 of the laminated shingle 150. The secondary release section 143 comprises a band that includes a length that spans from the first edge 144 of the shingle 150 to the second edge 145 of the shingle 150. The secondary release section 143, may include a width of about of 1 cm to 16 cm, 1.5 cm to 12 cm, or 2 cm to 8 cm. As shown in FIG. 6, the secondary release section 143 may run along the "common bond area" where the overlay sheet 160 and the underlay sheet 180 overlap. Alternatively, as shown in FIG. 7, the secondary release section 143 may run along the back side of the overlay sheet 160 adjacent to in close proximity (e.g., within 3 cm) to the underlay sheet 180. In other alternatives, the secondary release section 143 may be located in two locations on the shingle 150. For examples, the secondary release section 143 and the secondary release section 143 may run along the common bond area where the overlay sheet 160 and the underlay sheet 180 overlap as shown in FIG. 6 and the secondary release section 143 may also run along the back side of the overlay sheet 160 adjacent to in close proximity (e.g., within 3 cm) to the underlay sheet 180. The secondary release section 143 may be applied directly to the second asphalt coating 118 or the backdust layer of particles 120. The secondary release section 143 comprises a parting agent material and is free of a secondary release tape. While shown as a continuous strip, the secondary release section 143 may also be applied to form a design or a pattern.

The substrate of the shingle can be any type known for use in reinforcing asphalt-based roofing materials, such as a web, scrim or felt of fibrous materials such as mineral fibers, glass fibers, cellulose fibers, rag fibers, mixtures of glass and synthetic fibers, or the like. Combinations of materials can also be used in the substrate. In any of the exemplary embodiments, the substrate is a nonwoven web of glass fibers. The substrate may be any substrate used in asphalt shingles, roll roofing, low-slope membranes, and the like.

The asphalt coating, which may also be referred to as the asphalt coating composition, is generally formed from a layer of hot, melted asphalt applied to the substrate. The asphalt coating can be applied to the substrate in any suitable manner. For example, the substrate can be submerged in the asphalt or the asphalt can be rolled on, sprayed on, or applied to the substrate by other means. The asphalt coating may include any type of bituminous material suitable for use on a roofing material, such as asphalts, tars, pitches, or mixtures thereof. Suitable asphalts for use in the asphalt coating composition include manufactured asphalts produced by refining petroleum or naturally occurring asphalts. The asphalt coating composition may include various types or grades of asphalt, including flux, paving grade asphalt blends, propane washed asphalt, oxidized asphalts, and/or blends thereof. The asphalt coating composition may include one or more additives including, but not limited to, polymers, waxes, inorganic fillers, mineral stabilizers, recycled asphalt streams, and oils.

As indicated above, the asphalt coating composition may include a polymer. Asphalt compositions that include polymers may be referred to as polymer-modified asphalt compositions. Suitable polymers include, but are not limited to, styrene-butadiene-styrene (SBS), styrene-butadiene rubber (SBR), styrene-isoprene-styrene (SIS), thermoplastic polyolefin (TPO), atactic polypropylene (APP), ground tire rubber, styrenic block copolymers, styrene-ethylene-butylene-styrene (SEBS), and combinations thereof. In any of the exemplary embodiments, the asphalt coating composition may include from about 1 wt. % to about 25 wt. %, in other embodiments from about 2 wt. % to about 15 wt. %, and in other embodiments from about 3 wt. % to about 10 wt. % polymer based upon the total weight of the asphalt coating composition.

In any of the exemplary embodiments, the asphalt coating composition (with the inclusion of any optional additives) may be characterized by a penetration value in penetration units, which is often referred to colloquially as a pen or pen value. The penetration value may be determined using the procedure detailed in ASTM D, which is incorporated herein by reference. In any of the exemplary embodiments, where the penetration value is determined a temperature of 25° C. (77° F.) with a 100 gram weight, the penetration value may be greater than 12 penetration units, in other embodiments greater than 15 penetration units, in other embodiments greater than 18 penetration units, and in other embodiments greater than 20 penetration units. In any of the exemplary embodiments, where the penetration value is determined a temperature of 25° C. (77° F.) with a 100 gram weight, the penetration value may be less than 75 penetration units, in other embodiments less than 50 penetration units, in other embodiments less than 45 penetration units, and in other embodiments less than 40 penetration units. In any of the exemplary embodiments, where the penetration value is determined a temperature of 25° C. (77° F.) with a 100 gram weight, the penetration value may be from about 12 penetration units to about 75 penetration units, in other embodiments from about 15 penetration units to about 50 penetration units, in other embodiments from about 18 penetration units to about 45 penetration units, and in other embodiments from about 20 penetration units to about 40 penetration units.

The granules are generally deposited onto the asphalt coating after the asphalt coating is applied to the substrate. The shingles may be passed through rollers to further embed the granules into the asphalt coating. The granules may comprise a variety of different materials. The granules may be ceramic roofing grade granules that are made in any known or conventional manner. Any type of roofing granule may be used. The granules may comprise a variety of different particle sizes and colors. Further, a variety of different granules may be blended together, for example to provide different color blends or to provide the appearance of varying thickness to the shingle.

The layer of backdust particles may be deposited onto the asphalt coating after the asphalt coating is applied to the substrate. The shingles may be passed through rollers to further embed the backdust particles into the asphalt coating. As mentioned above, the backdust material is typically a particulate material. Exemplary materials for use as backdust include, but are not limited to, sand, talc, mica, calcium carbonate, ground recycled glass, quartz, feldspar, dolomite, coal slag, and other common inorganic materials. The backdust may comprise a variety of different particle sizes. For example, the backdust particles may have an average particle size in the range of 20 µm to 1,000 µm, 60 µm to 600 µm, 100 µm to 400 µm, or 100 µm to 300 µm.

One or more portions of the shingle may optionally comprise a reinforcement layer (e.g., reinforcement layer 151 as illustrated in FIG. 5). In any of the exemplary embodiments, the reinforcement layer may be attached to the asphalt coating, such as by the adhesive mixture of the asphalt coating or other adhesives. In any of the exemplary embodiments, the reinforcement layer may be a polymeric layer formed from, for example, a polyester, polyolefin (e.g., polypropylene, polyethylene), or the like. However, the reinforcement layer may be formed from other materials, such as, for example, paper, film, scrim material, and woven or non-woven glass.

For example, in any of the exemplary embodiments, the shingle may include a reinforcement layer comprising strip of woven polyester material applied to the surface of the shingle after application of the asphalt coating, such that the asphalt material penetrates the strip between the woven fibers of the polyester fabric, to embed the strip of material in the base asphaltic layer and secure the strip to the shingle. The polyester strip may be applied prior to the granule coating of the shingle, and the granules may not adhere to the strip-covered portion of the shingle. The strip of polyester material may, for example, define a shingle nail zone and provide reinforcement for the nailed portion of the shingle. In any of the exemplary embodiments, the reinforcement layer may have a width in the range of 0.5 cm to 8 cm, 1.5 cm to 7 cm, or 2 cm to 5 cm.

As shown in FIGS. 3 and 6, the single layer tabbed shingle 100 and laminated shingle 150 include an adhesive 130. The adhesive 130 may be any type of adhesive suitable for use in roofing materials. For example, the adhesive 130 may be a heat sensitive adhesive including, but not limited to, a filled asphalt adhesive and a polymer modified asphalt adhesive. The adhesive 130 adheres the tab portions 105, 167 of an upper course of shingles on a roof to the headlap portions 103, 161 of a lower course of shingles on the roof. The resulting adhesive bond helps prevent wind uplift of the shingles on the roof. While the adhesive 130 is shown as a strip, the adhesive 130 is not so limited and instead may be applied in various forms and configurations including, but not limited to, dots, lines, discontinuous segments, or combinations thereof.

Suitable materials for use in the parting agent material include materials that helps to prevent the sticking of two consecutively stacked shingles. In any of the exemplary embodiments, the parting agent may be oleophobic. Suitable parting agents include metal salts of fatty acids, silanes, siloxanes, silicones, silicone rubbers, silica nanoparticles, polysilazanes (e.g., inorganic perhydro-polysilazanes and organic polysilazanes), waxes (e.g., carnauba wax), styrene-butadiene rubbers (SBR), esters of acrylic resins, polyolefins, acrylic, acrylic copolymers, vinyl acetates, polyurethanes, acrylated urethanes, fluoropolymers (e.g., polytetrafluoroethylene, perfluoroalkoxy alkane, fluorinated ethylene propylene, ethylene tetrafluoroethylene, polyvinylidene fluoride, and ethylene chlorotrifluoroethylene), poly propyl methacrylate, and poly propyl methacrylate with fluorosalts.

The parting agent may be applied to form the parting agent material on the shingle in a neat fashion, as a solid, a liquid, a hot melt, or with the assistance of a carrier solvent. Parting agents applied with a carrier solvent include aqueous solutions, aqueous emulsions, and solvent based solutions. As those skilled in the art will appreciate certain carrier solvents may evaporate after they are applied to the shingle. Accordingly, compositions that include a parting agent material (with or without a solvent) prior to application to a shingle may be referred to herein as a parting agent composition.

In any of the exemplary embodiments, the parting agent material consists of the parting agent or a mixture of parting agents. In any of the exemplary embodiments, the parting agent material may include optional components such as wetting agents, emulsifiers, crosslinkers, and combinations thereof. In other embodiments, the parting material consists essentially of the parting agent or a mixture of parting agents. In these embodiments, the parting material may include a small amount (e.g., less than 5%) of components or additives that may be include for aesthetic, filling, or provide only a small or no change in the anti-sticking properties of the parting material.

Examples of suitable wetting agents include calcium hydroxide, non-ionic silicones, salts of fatty acids, alkylbenzene sulfonates, alkyl sulfates, alkyl ether sulfates, ethoxylates, amphoteric surfactants, nonionic surfactants, and combinations thereof.

In any of the exemplary embodiments, the parting agent material may be applied with a carrier solvent. Suitable carrier solvents include, but are not limited to, water and organic solvents. The parting agent material (and any optional components) may be dispersed in the carrier solvent to form a parting agent composition. The parting agent composition may be applied to the shingle using a variety of application methods. For example, the parting agent composition may be applied to the shingle by spraying, roll coating, transfer roll coating, flood coating, reverse roll coating, or another suitable application method. When the parting agent composition is applied to the shingle during the manufacturing process, a layer of the parting material is formed on the shingle. For example, when a parting agent composition is applied to the hot asphalt coating of the shingle, the carrier solvent (e.g., water) in the liquid-applied parting agent flashes off or otherwise vaporizes, leaving a residual layer of parting material on the asphalt coating of the shingle.

In any of the exemplary embodiments, the parting agent composition may be characterized by the weight of parting agent per volume of carrier solvent as a percentage. In any of the exemplary embodiments, the parting agent composition may include the parting agent material in an amount greater than 1%, in other embodiments greater than 2%, in other embodiments greater than 5%, in other embodiments greater than 6%, in other embodiments greater than 7%, and in other embodiments greater than 8% based upon the total weight of the parting agent composition. In any of the exemplary embodiments, the parting agent composition may include the parting agent material in an amount less than 99%, in other embodiments less than 50%, in other embodiments less than 20%, in other embodiments less than 15%, in other embodiments less than 12%, and in other embodiments less than 10% based upon the total weight of the parting agent composition. In any of the exemplary embodiments, the parting agent composition may include the parting agent material in an amount in the range of 1% to 99%, in other embodiments in the range of 2% to 50%, in other embodiments in the range of 5% to 20%, in other embodiments in the range of 6% to 15%, in other embodiments in the range of 7% to 12%, and in other embodiments in the range of 8% to 10% based upon the total weight of the parting agent composition.

As indicated above, the parting agent material may include optional components such as wetting agents, emulsifiers, and combinations thereof. The wetting agents, emulsifiers, or combinations thereof may be included in the parting agent composition.

In any of the exemplary embodiments, where the parting agent composition includes an emulsifier the parting agent composition may be characterized by the weight of emulsifier per volume of carrier solvent as a percentage. In any of the exemplary embodiments, the parting agent composition may include the emulsifier in an amount in the range of 0.1%-20%, in other embodiments in the range of 1% to 5%, in other embodiments in the range of 1.5% to 4%, and in other embodiments in the range of 2% to 3% based upon the total weight of the parting agent composition.

In any of the exemplary embodiments, where the parting agent composition includes a wetting agent the parting agent composition may be characterized by the weight of wetting agent per volume of carrier solvent as a percentage. In any of the exemplary embodiments, the parting agent composition may include the wetting agent in an amount in the range of 0.005% to 10%, in other embodiments in the range of 0.01% to 5%, in other embodiments in the range of 0.1% to 0.8%, and in other embodiments in the range of 0.2% to 0.6% based upon the total weight of the parting agent composition.

As indicated above, metal salts of fatty acids may be employed as the parting agent material Metal salts of fatty acids, which may sometimes be referred to as metal soaps, include those compounds that have a saturated or unsaturated residue of a fatty acid and a metal ion. Each metal salt of a fatty acid may have one or more residues of a fatty acid per metal ion based upon the charge of the metal ion. In any of the exemplary embodiments, the metal salts of fatty acids may have linear carbon chain that includes from 12 to 22 carbon atoms, and in other embodiments from 14 to 18 carbons atoms. While not wishing to be bound by any particular theory or method of operation, it is believed that the chain portion of the fatty acid will allow at least of a portion of the metal salt of a fatty acid to be absorbed into the asphalt coating. However, the ionic metal will prevent complete absorption of the metal salt of a fatty acid. Accordingly, the metal salt of a fatty acid remains at least partially on the surface of the asphalt coating allowing it to function as a parting agent material.

In any of the exemplary embodiments, the metal salt of the fatty acid may have a low solubility in water. In any of the exemplary embodiments, the metal salt of a fatty acid may be characterized by the solubility of the metal salt of a fatty acid in water at 15° C. In any of the exemplary embodiments, the metal salt of a fatty acid has a solubility of less than 0.010 g/100 mL at 15° C., less than 0.008 g/100 mL at 15° C., less than 0.006 g/100 mL at 15° C., less than 0.005 g/100 mL at 15° C., or less than 0.004 g/100 mL at 15° C. As the metal salt of a fatty acid has low solubility in water, it remains in particulate form in the emulsion and does not dissolve. The parting agent composition that includes a metal salt of a fatty acid that has low solubility in water may also be referred to as a dispersion or a slurry. In these or other embodiments, the metal salt of a fatty acid may be characterized by a median particle size. In any of the exemplary embodiments, the median particle size of the metal salt of a fatty acid may be in the range of 4 microns to 7 microns and in other embodiments 5.5 microns to 6.5 microns.

In any of the exemplary embodiments, the metal salt of a fatty acid may include a saturated fatty acid. Suitable metal salts of saturated fatty acids include, but are not limited to, metal laurates, metal myristates, metal palmitates, and metal stearates. Exemplary metal laurates include, but are not limited to, zinc laurate, calcium laurate, aluminum laurate, and magnesium laurate. Exemplary metal myristates include, but are not limited to, zinc myristate, calcium myristate, aluminum myristate, and magnesium myristate. Exemplary metal palmitates include, but are not limited to, zinc palmitate, calcium palmitate, aluminum palmitate, and magnesium palmitate. Exemplary metal stearates include, but are not limited to, zinc stearate, calcium stearate, aluminum stearate, and magnesium stearate.

As indicated above, polyolefins may be employed as the parting agent material. Exemplary polyolefins include, but are not limited to, polyethylene and polypropylene. In any of the exemplary embodiments, the polyolefin may be characterized by a glass transition temperature ("Tg"). In any of the exemplary embodiments, where the parting agent material is applied to a hot asphalt surface, the Tg of the polyolefin may be less than the surface temperature of the asphalt. In any of the exemplary embodiments, the Tg may be less than 230° C., in other embodiments less than 200° C., an in other embodiments less than 180° C. In any of the exemplary embodiments, the Tg may be in the range of 50° C. to 230° C., in other embodiments in the range of 60° C. to 200° C., in other embodiments in the range of 70° C. to 180° C., in other embodiments in the range of 80° C. to 160° C., and in other embodiments in the range of 90° C. to 150° C.

As indicated above, silanes may be employed as the parting agent material. Silane compounds may be defined by the formula:

$$SiR_4$$

where each R is individually selected from a hydrogen atom and a monovalent organic group. In any of the exemplary embodiments, each R is individually a monovalent organic group. In any of the exemplary embodiments, the monovalent organic group may a linear, cyclic, or branched hydrocarbon group having from 1 to 20 carbon atoms. In any of the exemplary embodiments, the monovalent organic group may have 2 to 6 carbon atoms. Optionally, one or more of the hydrogen or carbon atoms in the hydrocarbon groups may be substituted with a heteroatom such as an oxygen atom, a silicon atom or a halogen atom. Exemplary monovalent organic groups include methyl, ethyl, and phenyl groups. Exemplary silanes include methyltrimethoxysilane, gamma-aminopropyltriethoxysilane, and gamma-glycidoxypropylthrimethoxysilane.

In any of the exemplary embodiments, the silane may be a superhydrophobic silane. Superhydrophobic silanes provide a coating that produces a contact angle greater than 150 degrees. The contact angle may be determined by placing a droplet of water on the surface of the hydrophobic material. The contact angle of a droplet of water may be measured at room temperature (i.e., 23° C.) using a goniometer on a 6 microliter droplet of deionized (DI) water. The measurement should be determined after the droplet has come to rest on the hydrophobic surface (e.g., between 10 to 20 seconds after the droplet is applied to the surface). Multiple determinations of the contact angle should be averaged (e.g. 5 or 10 replicates) to obtain a final value.

In any of the exemplary embodiments, where one or more of the monovalent organic groups of the silane compound are alkoxy groups or siloxy groups, the silane compound may also be referred to as a siloxane. Siloxane compounds may be defined by the formula $$SiR_{4-n}(OR')_n$$

where each R is individually selected from a hydrogen atom and a monovalent organic group, each R' is a monovalent organic group, and n is an integer from 1 to 4. In any of the exemplary embodiments, each R is individually a monovalent organic group. In any of the exemplary embodiments, the monovalent organic group may a linear, cyclic, or branched hydrocarbon group having from 1 to 20 carbon atoms. In any of the exemplary embodiments, the monovalent organic group may have 2 to 6 carbon atoms. In any of the exemplary embodiments, the monovalent organic group may be a siloxy group. In any of the exemplary embodiments, the monovalent organic group, R', may be a trialkylsilyl group. Optionally, one or more of the hydrogen or carbon atoms in the hydrocarbon groups may be substituted with a heteroatom such as an oxygen atom, a silicon atom, or a halogen atom. Exemplary monovalent organic groups include methyl, ethyl, and phenyl groups. Exemplary siloxanes include octamethyldisiloxane, hexamethyldisiloxane, and hexamethylcyclotetrasiloxane.

Suitable silicones include polysiloxane oligomers and polymers. The silicone may be linear, branched, or cyclic, or crosslinked in structure. In any of the exemplary embodiments, the silicone may be defined by the formula $$[R_2SiO]_n$$

where each R is individually a monovalent organic group and n is in the range of 5 to 10,000. In any of the exemplary embodiments, n may be from 10 to 5,000, in other embodiments n may be from 20 to 500. In any of the exemplary embodiments, the monovalent organic group may a linear, cyclic, or branched hydrocarbon group having from 1 to 20 carbon atoms. In any of the exemplary embodiments, the monovalent organic group may have 2 to 6 carbon atoms. Optionally, one or more of the hydrogen or carbon atoms in the hydrocarbon groups may be substituted with a heteroatom, such as a silicon atom or a halogen atom, or a polysiloxane chain. Exemplary monovalent organic groups include methyl, ethyl and phenyl groups. Exemplary silicones include polyether-modified siloxane, polyether-modified polysiloxane, polyether-modified polydimethylsiloxane, dimethyl silicone fluid, emulsions of silicone rubber, silicone oil, and polydimethylsiloxane.

The parting agent material may be described by the mass of the parting agent material applied per square meter on a dry basis. In any of the exemplary embodiments, the amount of parting agent material may be greater than 0.0005 kg/m$^2$ to 1 kg/m$^2$, in other embodiments greater than 0.001 kg/m$^2$, in other embodiments greater than 0.005 kg/m$^2$, in other embodiments greater than 0.006 kg/m$^2$, in other embodiments greater than 0.007 kg/m$^2$, in other embodiments greater than 0.008 kg/m$^2$, and in other embodiments greater than 0.009 kg/m$^2$. In any of the exemplary embodiments, the amount of parting agent material may be less than 1 kg/m$^2$, in other embodiments less than 0.5 kg/m$^2$, in other embodiments less than 0.022 kg/m$^2$, in other embodiments less than 0.016 kg/m$^2$, in other embodiments less than 0.014 kg/m$^2$, in other embodiments less than 0.012 kg/m$^2$, and in other embodiments less than 0.011 kg/m$^2$. In any of the exemplary embodiments, the amount of parting agent material may be in the range of 0.0005 kg/m$^2$ to 1 kg/m$^2$, in other embodiments from 0.001 kg/m$^2$ to 0.5 kg/m$^2$, in other embodiments from 0.005 kg/m$^2$ to 0.022 kg/m$^2$, in other embodiments from 0.006 kg/m$^2$ to 0.016 kg/m$^2$, in other embodiments from 0.007 kg/m$^2$ to 0.014 kg/m$^2$, in other embodiments from 0.008 kg/m$^2$ to 0.012 kg/m$^2$, and in other embodiments from 0.009 kg/m$^2$ to 0.011 kg/m$^2$.

In any of the exemplary embodiments, the parting agent material may include two or more layers. In these or other embodiments, the parting agent material may include a polymeric support layer disposed on the backdust layer or the asphalt layer of the shingle and layer of parting material disposed on the polymeric support layer. In embodiments that include two or more release sections, parting agent materials that include a polymeric support layer and a parting material layer may be used in conjunction with a layer of parting agent material (i.e., without a polymeric support layer) and/or a release tape. For example, a shingle may include a primary release section that includes polymeric support layer and a layer of parting material and a secondary release section that includes a layer of parting material (i.e., without a polymeric support layer).

Suitable polymeric support layers may include acrylics, acrylated urethanes, poly(p-xylylene) polymers (which may also be referred to as parylenes), and combinations thereof.

As indicated above, the parting agent material may prevent shingles from sticking to each other when stacked. Shingles are generally stacked and packaged for storage and transport, e.g. in a wrapper, bag, box, or the like. Typically, the shingles are stacked in either a front-to-back (i.e. granule side to bottom) or an alternating front-to-front/back-to-back configuration. A bundle of shingles may be prepared that typically includes 16 to 22 stacked shingles. Each bundle may be placed inside of a package. The package may take a wide variety of forms, such as a plastic wrapper, a paper wrapper, a plastic bag, shrink wrap, a cardboard box, a polyethylene wrapper FIG. 8 provides a side elevational view of stack of a single layer tabbed shingles 200. The stack of a single layer tabbed shingles 200 includes a first single layer tabbed shingle 202 that includes an asphalt-coated substrate 210. The asphalt-coated substrate 210 includes a front side 204 and an opposing back side 206. The back side 206 of the asphalt-coated substrate 210 includes a release section 214 (e.g., a parting material). The front side 204 of the asphalt-coated substrate 210 includes an adhesive 216. Similarly, the stack of a single layer tabbed shingles 200 also includes a second single layer tabbed shingle 202' that includes an asphalt-coated substrate 210'. The asphalt-coated substrate 210' includes a front side 204' and an opposing back side 206'. The back side 206' of the asphalt-coated substrate 210' includes a release section 214' (e.g., a parting material). The front side 204' of the asphalt-coated substrate 210' includes an adhesive 216'. The stack of a single layer tabbed shingles 200 shows the first single layer tabbed shingle 202 and the second single layer tabbed shingle 202' in a front-to-back configuration, where the primary release section 214 of the first single layer tabbed shingle 202 is in contact with the adhesive 216' of the second single layer tabbed shingle 202'. Multiple stacks of the single layer tabbed shingles 200 may be stacked to repeated in a front-to-back configuration. Depending upon the location of the release sections 214, 214' and the adhesives 216, 216' on the asphalt-coated substrates 210, 201', the shingles 202, 202' may be stack so all of the tabbed sections are facing the same directions or the tabbed section can alternate directions for successive shingles or groups of successive shingles.

FIGS. 9 and 10 are side elevational views of stack of laminated shingles. The stack of a laminated shingles 250 includes a first laminated shingle 251 that includes a first asphalt-coated substrate 254 laminated to a second asphalt-coated substrate 256. The first laminated shingle 251 includes a front side 270 and an opposing back side 272. The back side 272 of the first laminated shingle 251 includes a primary release section 260 (e.g., release tape or a parting material), a secondary release section 258 (e.g., a parting material), and an adhesive 262. Similarly, the stack of a laminated shingles 250 includes a second laminated shingle 251' that includes a first asphalt-coated substrate 254' laminated to a second asphalt-coated substrate 256'. The second laminated shingle 251' includes a front side 270' and an opposing back side 272'. The back side 272' of the second laminated shingle 251' includes a primary release section 260' (e.g., release tape or a parting material), a secondary release section 258'(e.g., a parting material), and an adhesive 262'. The stack of a laminated shingles 250 shows the first laminated shingle 251 and the second laminated shingle 251' in a back-to-back configuration, where the primary release section 260 of the first laminated shingle 251 is in contact with the adhesive 262' of the second laminated shingle 251'. Similarly, the primary release section 260' of the second laminated shingle 251' is in contact with the adhesive 262 of the first laminated shingle 251. Further, the secondary release section 258 of the first laminated shingle 251 is in contact with the back side 272' of the second laminated shingle 251'. Similarly, the secondary release section 258' of the second laminated shingle 251' is in contact with the back side 272 of the first laminated shingle 251. While show as separated by a gap in FIG. 8, the second release second 258 and second release section 258' may touch or overlap. Multiple stacks of laminated shingles 200 may be stacked to form alternating front-to-front/back-to-back configuration.

As indicated above, the use of a release section that includes a parting agent material reduces shingle to shingle sticking. A lap shear test may be performed to determine the force required to separate the two shingles placed back to back. A sample for the lap shear test may be prepared by placing the back side of a first 6 inch long and 1⅞ inch wide specimen of shingle against the back side of a second 6 inch long and 1⅞ inch wide specimen of shingle so that they have an overlap region of 2 inches. The first specimen includes the parting agent material in the overlapped region while the second material only includes a layer of backdust. A weight of 20 lbs. is applied to the top of the two shingle samples placed back to back for 24 hours at 132±2° F. The two-shingle specimen are then separated on a tensile tester, such as an Instron tensile tester, with crosshead speed of 2 inches per minute with a gauge length of 7 inches to calculate the maximum breaking force required to separate the two specimens.

In any of the exemplary embodiments, the force required to separate the two shingles that include a band of parting agent material determined via the above described lap shear test may be less than 110 lbs. of force, in other embodiments less than 100 lbs. in other embodiments less than 80 lbs. in other embodiments less than 50 lbs. of force, in other embodiments less than 40 lbs. of force, and in other embodiments less than 35 lbs. of force. In any of the exemplary embodiments, the force required to separate the two shingles that include a band of parting material determined via a lap shear test may be in the range of 5 lbs. of force to 110 lbs. of force, in other embodiments in the range of 7 lbs. of force to 100 lbs. of force, in other embodiments in the range of 8 lbs. of force to 80 lbs. of force, in other embodiments in the range of 10 lbs. of force to 50 lbs. of force, in other embodiments in the range of 15 lbs. of force to 40 lbs. of force, and in other embodiments in the range of 20 lbs. of force to 35 lbs. of force.

Figure 11:
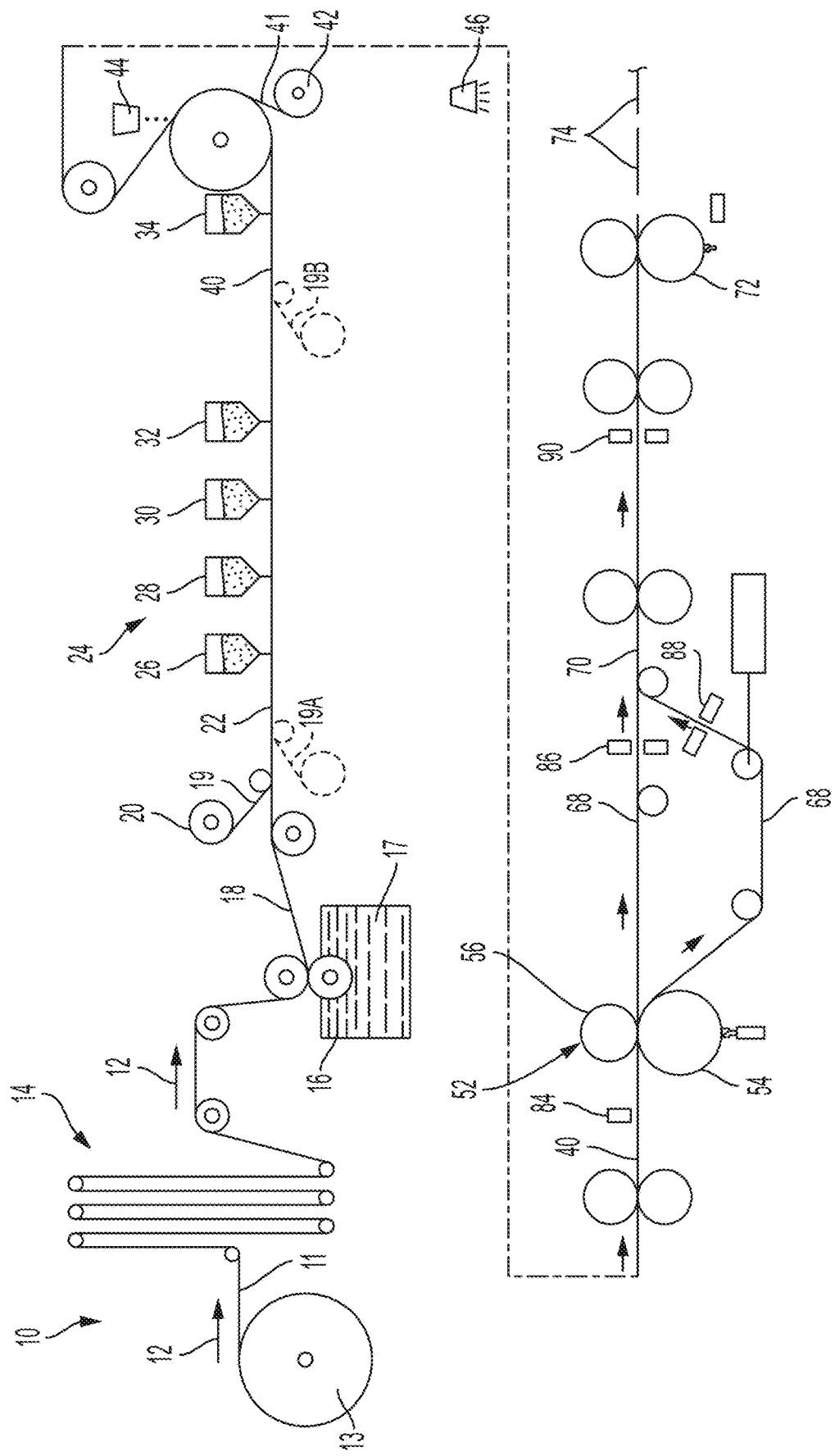
FIG. 11 is a schematic view in elevation of an exemplary embodiment of an apparatus for manufacturing an asphalt-based roofing material of the present disclosure.

An exemplary apparatus 10 for manufacturing a shingle with a band of parting material is shown in FIG. 11. The illustrated manufacturing process involves passing a continuous sheet of substrate or shingle mat 11 in a machine direction 12 through a series of manufacturing operations. The mat 11 usually moves at a speed of at least about 200 feet/minute (61 meters/minute), and typically at a speed within the range of between about 450 feet/minute (137 meters/minute) and about 1200 feet/minute (366 meters/minute). The sheet, however, may move at any desired speed.

In a first step of the manufacturing process, the continuous sheet of shingle mat 11 is payed out from a roll 13. The shingle mat 11 may be any type known for use in reinforcing asphalt-based roofing materials, such as a nonwoven web of glass fibers. Alternatively, the substrate may be a scrim or felt of fibrous materials such as mineral fibers, cellulose fibers, rag fibers, mixtures of mineral and synthetic fibers, or the like.

The sheet of shingle mat 11 is passed from the roll 13 through an accumulator 14. The accumulator 14 allows time for splicing one roll 13 of substrate to another, during which time the shingle mat 11 within the accumulator 14 is fed to the manufacturing process so that the splicing does not interrupt manufacturing.

Next, the shingle mat 11 is passed through a coater 16 where a coating of asphalt 17 is applied to the shingle mat 11 to form a first asphalt-coated sheet 18. The asphalt coating 17 may be applied in any suitable manner. In the illustrated embodiment, the shingle mat 11 contacts a supply of hot, melted asphalt 17 to completely cover the shingle mat 11 with a tacky coating of asphalt 17. However, in other embodiments, the asphalt coating 17 could be sprayed on, rolled on, or applied to the shingle mat 11 by other means. Typically, the asphalt coating is highly filled with a ground mineral filler material, amounting to at least about 60 percent by weight of the asphalt/filler combination. In one embodiment, the asphalt coating 17 is in a range from about 350° F. to about 400° F. In another embodiment, the asphalt coating 17 may be more than 400° F. or less than 350° F. The shingle mat 11 exits the coater 16 as a first asphalt-coated sheet 18. The asphalt coating 17 on the first asphalt-coated sheet 18 remains hot.

A continuous strip of a reinforcement material 19, as will be described in detail herein, may then be payed out from a roll 20. The reinforcement material 19 adheres to the first asphalt-coated sheet 18 to define a second asphalt-coated sheet 22. In a first embodiment, the reinforcement material 19 is attached to the sheet 18 by the adhesive mixture of the asphalt in the first asphalt-coated sheet 18. The reinforcement material 19, however, may be attached to the sheet 18 by any suitable means, such as other adhesives. As described above, the reinforcement material 19 may be a polymeric layer formed from, for example, a polyester, polyolefin (e.g., polypropylene, polyethylene), or the like. However, the reinforcement material 19 may also be formed from other materials, such as, for example, paper, film, scrim material, and woven or non-woven glass.

The resulting second asphalt coated sheet 22 may then be passed beneath a series of granule dispensers 24 for the application of granules to the upper surface of the second asphalt-coated sheet 22. The granule dispensers may be of any type suitable for depositing granules onto the asphalt-coated sheet. A granule dispenser that may be used is a granule valve of the type disclosed in U.S. Pat. No. 6,610,147 to Aschenbeck. The initial granule blender 26 may deposit partial blend drops of background granules of a first color blend on the tab portion of the second asphalt coated sheet 22 in a pattern that sets or establishes the trailing edge of subsequent blend drops of a second color blend (of an accent color) and a third color blend (of a different accent color). For purposes of this disclosure, the first color blend and the background granules are synonymous. The use of initially applied partial blend drops to define the trailing edge of subsequent blend drops is useful where accurate or sharp leading edges are possible, but accurate trailing edges at high shingle manufacturing speeds are difficult.

As is well known in the art, blend drops applied to the asphalt-coated sheet are often made up of granules of several different colors. For example, one particular blend drop that is supposed to simulate a weathered wood appearance might actually consist of some brown granules, some dark gray granules, and some light gray granules. When these granules are mixed together and applied to the sheet in a generally uniformly mixed manner, the overall appearance of weathered wood is achieved. For this reason, the blend drops are referred to as having a color blend, which gives an overall color appearance. This overall appearance may be different from any of the actual colors of the granules in the color blend. In addition, blend drops of darker and lighter shades of the same color, such as, for example, dark gray and light gray, are referred to as different color blends rather than merely different shades of one color.

As shown in FIG. 11, the series of dispensers 24 includes four color-blend blenders 26, 28, 30, and 32. Any desired number of blenders, however, may be used. The final blender may be the background blender 34. Each of the blenders may be supplied with granules from sources of granules, not shown. After the blend drops are deposited on the second asphalt-coated sheet 22, the remaining, uncovered areas are still tacky with warm, uncovered asphalt, and the background granules from the background blender 34 will adhere to the areas that are not already covered with blend drop granules. After all the granules are deposited on the second asphalt-coated sheet 22 by the series of dispensers 24, the sheet 22 becomes a granule-covered sheet 40.

In the illustrated embodiment, the reinforcement material 19 includes an upper surface to which granules substantially will not adhere. Granules may therefore be deposited onto substantially the entire second asphalt-coated sheet 22, including the material 19, but wherein the reinforcement material 19 includes an upper surface to which granules substantially will not adhere.

The granule-covered sheet 40 may then be turned around a slate drum to press the granules into the asphalt coating and to temporarily invert the sheet so that the excess granules will fall off and will be recovered and reused. Typically, the granules applied by the background blender 34 are made up by collecting the backfall granules falling from the slate drum.

In any of the exemplary embodiments, the primary release section may be a release tape. If desired, release tape 41 may be applied to the back side of the granule-covered sheet 40. For example, as shown in FIG. 1, release tape 41 may be applied from an applicator or roll 42 as the granule-coated sheet 40 moves around a slate drum. While the granule-coated sheet 40 is inverted, backdust is applied to the back surface of the sheet. The backdust is supplied from a backdust applicator 44.

After the application of the back dust from the backdust applicator 44, the back side of the granule-covered sheet 40 is passed through a parting agent composition applicator 46. The parting agent composition applicator 46 applies the parting agent composition to the back side of the granule-covered sheet 40. While a single parting agent composition applicator 46 is shown, one or more parting agent composition applicators 46 may be used to apply a secondary release section and optionally a primary release section (in the absences of release tape). Further, additional parting agent composition applicators may be used to apply a polymer support section prior to the inclusion of the parting material Although FIG. 9 illustrates application of the parting agent composition by spraying via parting agent composition applicator 46, parting agent composition applicator 46 may take other forms or apply different methods of application including, but not limited to, roll coating, flood coating, reverse roll coating, or any other suitable method for applying the liquid-applied parting agent. Further, as indicated above, the parting agent material may be applied neat or in a solid form. After the parting agent composition is applied to the back side of the shingle the carrier solvent (if included) may be removed to produce the parting material, for example, though the heat of the hot asphalt or a separate heating element (not shown).

The granule-covered sheet 40 may subsequently be fed through a rotary pattern cutter 52, which includes a bladed cutting cylinder 54 and a backup roll 56, as shown in FIG. 11. If desired, the pattern cutter 52 may cut a series of cutouts in the tab portion of the granule-covered sheet 40 and cut a series of notches in the underlay portion of the granule-covered sheet 40.

The pattern cutter 52 may also cut the granule-covered sheet 40 into a continuous underlay sheet 66 and a continuous overlay sheet 68. The underlay sheet 66 may be directed to be aligned beneath the overlay sheet 68, and the two sheets may be laminated together to form a continuous laminated sheet 70. As shown in FIG. 11, the continuous underlay sheet 66 may be routed on a longer path than the path of the continuous overlay sheet 68. Further downstream, the continuous laminated sheet 70 may be passed into contact with a rotary length cutter 72 that cuts the laminated sheet into individual laminated shingles 74.

In order to facilitate synchronization of the cutting and laminating steps, various sensors and controls may be employed. For example, sensors, such as photo eyes 86 and 88 may be used to synchronize the continuous underlay sheet 66 with the continuous overlay sheet 68. Sensors 90 may also be used to synchronize the notches and cutouts of the continuous laminated sheet with the end cutter or length cutter 72.

The above description of specific embodiments has been given by way of example. Any combination or sub-combination of the described shingle features, may be combined to form a shingle. From the disclosure given, those skilled in the art will not only understand the general inventive concepts and attendant advantages, but will also find apparent various changes and modifications to the structures and methods disclosed. For example, the general inventive concepts are not typically limited to any particular roofing application. Thus, for example, use of the inventive concepts to both residential and commercial roofing applications, are within the spirit and scope of the general inventive concepts. As another example, although the embodiments disclosed herein have been primarily directed to asphalt-based roofing shingles, the general inventive concepts could be readily extended to any roofing material which could benefit from the general inventive concepts described herein. Furthermore, the general inventive concepts could be readily applied to various shingle designs, such as for example, single layer, three tab shingles or multi-layer, laminate shingles. It is sought, therefore, to cover all such changes and modifications as fall within the spirit and scope of the general inventive concepts, as described and claimed herein, and equivalents thereof.

EXAMPLES

A run of shingles was prepared by omitting a secondary release tape and spraying a band of a solution of a calcium stearate particulate (CD 220 available from American eChem) at various concentrations to the back side of the shingle to prepare a release section. The solution of a calcium stearate particulate was sprayed to the back side of the shingle on the common bond region directly onto backdust layer while the asphalt was hot from the asphalt coating step. The solution of a calcium stearate particulate was diluted to concentrations of 5%, 8%, and 10% to produce bands of parting agent concentrations on the shingle at 0.005 kg/m$^2$, 0.008 kg/m$^2$, and 0.010 kg/m$^2$. Additionally, a control with no tape was prepared by making a run of shingles that omitted both a secondary release tape and the solution of a calcium stearate particulate. A second control was prepared by including a secondary release tape.

Figure 12:
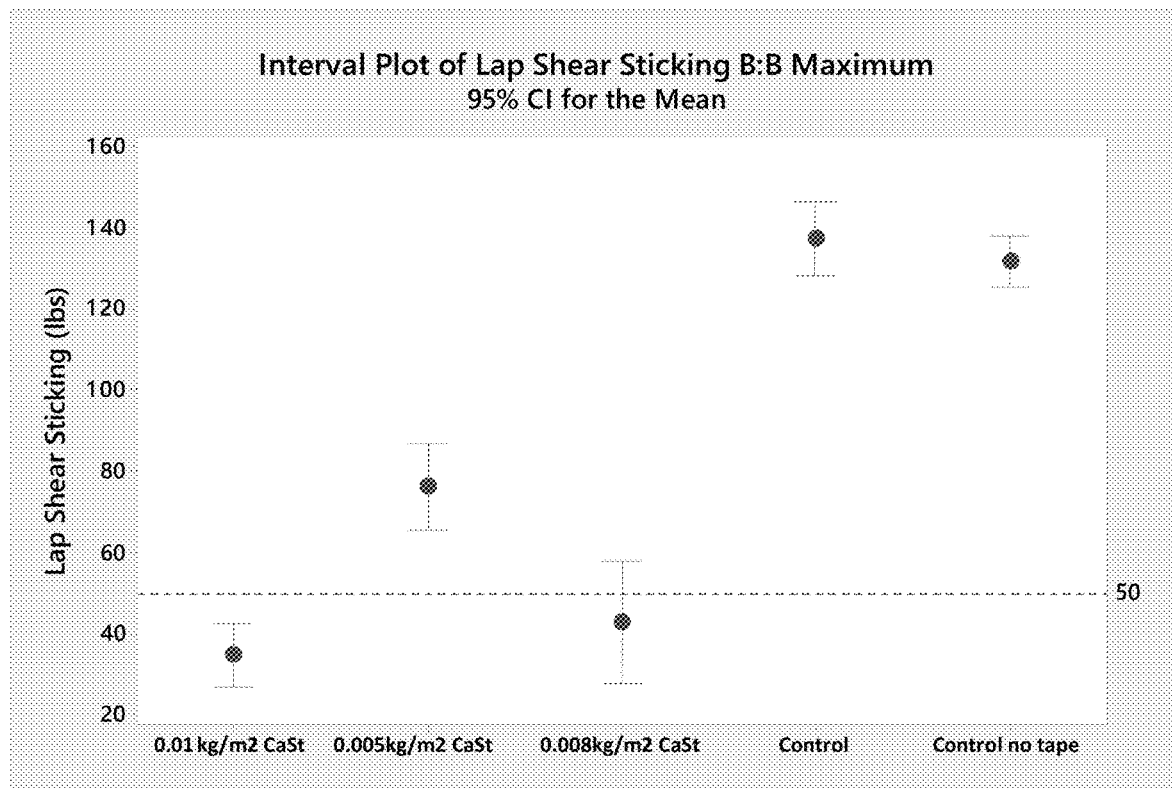
FIG. 12 is a graph of lap shear data of various shingles that include a band of parting material compared to control shingles.

The shingles were prepared into samples for lap shear analysis by cutting them into 6-inch-long and 1⅞ inch wide specimen. For shingles that included the calcium stearate release section or the secondary release tape, the calcium stearate release section or the secondary release tape is included in the portion of a first specimen that is overlapped with a second specimen for analysis. The second specimen does not include a calcium stearate release section or the secondary release tape. The first and second specimen were stacked back to back so that they had an overlap of 2 inches. A weight of 20 lbs. was applied to the top of the two-shingle specimen placed back to back for 24 hours at 132±2° F. After 24 hours, the two-shingle specimen were then separated on an Instron tensile tester with crosshead speed of 2 inches per minute with a gauge length of 7 inches to calculate the maximum breaking force required to separate the two specimen. Averaged results of 8 replicates of testing are shown in FIG. 12. As can be seen in FIG. 12, parting agent material that include parting agents such as calcium stearate produce results that are comparable or better than the use of a release tape.

While the invention has been illustrated and described in detail in the drawings and foregoing description, the same is to be considered as illustrative and not restrictive in character. It should be understood that only the exemplary embodiments have been shown and described and that all changes and modifications that come within the spirit of the invention are desired to be protected.

What is claimed is:

1. A bundle of shingles comprising:
  a first shingle stacked upon a second shingle, where the first shingle and the second shingle each comprise:
    an asphalt-coated substrate having a first surface at least partially covered in granules on a front side of the shingle and an opposing second surface at least partially covered in backdust on a back side of the shingle;
    an adhesive; and
    a primary release section,
  wherein at least one of the first and second shingle further include a secondary release section disposed on the back side of the shingle and comprising a parting agent material, wherein the parting agent material is included on the shingle in an amount from 0.005 kg/m$^2$ to 0.022 kg/m$^2$, wherein the parting agent material is an oleophobic composition comprising a metal salt of a fatty acid,
  wherein the adhesive of the first shingle is in contact with the primary release section of the second shingle and the adhesive of the second shingle is in contact with the primary release section of the first shingle,
  wherein the secondary release section of the first shingle is in contact with the backdust of the second shingle and secondary release section of the second shingle is in contact with the backdust of the first shingle, and
  wherein the parting agent material provides a lap shear of less than 110 lbs. of force to the shingle.

2. The bundle of shingles of claim 1, wherein the first shingle and the second shingle are oriented such that the front side of the first shingle faces the back side of the second shingle.

3. The bundle of shingles of claim 1, wherein the first shingle and the second shingle are oriented such that the back side of the first shingle faces the back side of the second shingle.

4. The bundle of shingles of claim 1, wherein the secondary release section is located on the back side of each of the first shingle and the second shingle.

5. The bundle of shingles of claim 4, wherein the primary release section is located on the back side of each of the first shingle and the second shingle.

6. The bundle of shingles of claim 4, wherein the primary release section is located on the front side of each of the first shingle and the second shingle.

7. The bundle of shingles of claim 1, wherein the primary release section comprises a primary release tape.

8. The bundle of shingles of claim 1, wherein the primary release section comprises the parting agent material.

9. The bundle of shingles of claim 1, wherein the first shingle and the second shingle are each single layer tabbed shingles.

10. The bundle of shingles of claim 1, wherein the first shingle and the second shingle are each laminated shingles.

11. The bundle of shingles of claim 1, wherein the secondary release section is free of a release tape.

12. The bundle of shingles of claim 1, wherein the parting agent material is included on the shingle in an amount from $0.005$ kg/m$^2$ to $0.010$ kg/m$^2$.

13. The bundle of shingles of claim 1, wherein the parting agent material is included on the shingle in an amount from $0.008$ kg/m$^2$ to $0.012$ kg/m$^2$.

14. The bundle of shingles of claim 1, wherein the primary release section has a width of 0.5 cm to 6 cm and the secondary release section is a longitudinal band having a width of 1 cm to 16 cm.

15. The bundle of shingles of claim 14, wherein the primary release section has a width of 1 cm to 2.6 cm and the secondary release section has a width of 2 to 8 cm.

16. The bundle of shingles of claim 1, wherein the primary release section comprises a release tape and the secondary release section is free of a release tape.

* * * * *